UNITED STATES PATENT OFFICE.

HENRI SCHMIDT, OF MEUDON, FRANCE.

PROCESS FOR THE MANUFACTURE OF PRODUCTS HAVING A VEGETABLE BASE.

1,128,628.  Specification of Letters Patent.  Patented Feb. 16, 1915.

No Drawing.   Application filed December 26, 1911.   Serial No. 667,673.

*To all whom it may concern:*

Be it known that I, HENRI SCHMIDT, chemist, a citizen of the French Republic, residing at 7 Rue du Parc, Meudon, Department of the Seine and Oise, France, have invented certain new and useful Improvements in Processes for the Manufacture of Products Having a Vegetable Base, of which the following is a specification.

The present invention has for its object a method of obtaining products which simplify and accelerate the preparation by the public of hot beverages, gargles, lotions and so forth with a vegetable base.

This process is broadly characterized by the fact that on the one hand the fixed substances soluble in water and on the other hand the volatile substances are extracted from the plant in avoiding any alteration with care and then by the fact that these several substances are combined with adding sugar in such a manner as to form a thick mass which is divided into pellets or pieces of spherical ovoid or any other appropriate form, these pellets being then coated with a protecting layer of sugar or other appropriate material. In order to prepare these products in the first place the quantity of plants or portions of a plant corresponding to a given number of cups of tisane must be taken. The latter is prepared in the ordinary way, that is to say, by infusion, decoction or maceration in water. The liquid portion is separated by expressing or filtering it and is placed in an evaporating apparatus *in vacuo* where it is evaporated at a low temperature until an extract presenting the consistency of a soft paste is obtained. This extract is treated with a 15 per cent. alcoholic solution, filtered in order to eliminate precipitated mucilaginous substances and again evaporated *in vacuo*. The same quantity of plant or of parts of plant are also taken and distilled by steam in such a manner as to extract therefrom the essential oil which is carefully collected.

The soft extract obtained in the first place is mixed in a mortar with powdered sugar in such a manner as to form a mass of pilular consistency with which the essential oil collected in the course of the distillation is incorporated. This mass in then divided into pellets of appropriate form which are subjected to desiccation at a low temperature and then coated with a sufficiently thick layer of sugar or any other appropriate protecting material.

The number of pellets obtained corresponds with the number of cups determined in advance and merely by solution in boiling water, each of these pellets gives an infusion of the plant with which the operation has been made. Thus infusions of tea, camomile, orange, lime and so forth or lotions, gargles, tisanes, hot beverages or any other aqueous preparation with a vegetable base is formed.

The operation can be carried out with a single plant or with a mixture of several plants.

Having now particularly described and ascertained the nature of my said invention and in what manner the same is to be performed, I declare that what I claim is:

1. Process of making extracts from vegetable substances consisting in taking vegetable substances used both for their volatile constituents and for their constituents soluble in water, extracting the fixed substances with water and evaporating *in vacuo* to the consistency of a soft paste, treating the paste with a 15 per cent. alcoholic solution filtering, and again evaporating *in vacuo*, extracting the volatile substances, mixing sugar with the extracted fixed substances and incorporating the volatile substances therewith.

2. Process of making extracts from vegetable substances, consisting in taking vegetable substances used both for their volatile constituents and for their constituents soluble in water, extracting the fixed substances with water, evaporating to the consistency of a soft paste, treating the paste with a 15 per cent. alcoholic solution, filtering, evaporating the solution *in vacuo*, adding to the extract so obtained sugar and essential oil, mixing, dividing the products into pellets, drying said pellets at a low temperature and then coating them with a layer of sugar.

3. Process of making extracts from vegetable substances consisting in taking vegetable substances used both for their volatile constituents and for their constituents soluble in water, infusing same, separating the liquid, evaporating said liquid *in vacuo* until an extract presenting the consistency of a soft paste is obtained, treating the paste with a 15 per cent. alcoholic solution filtering, again evaporating said paste *in vacuo*, mixing this substance with sugar and the essential oil obtained by distilling another portion of vegetable substances of the same kind as that from which the fixed substances are extracted, dividing same into pellets of various sizes and coating them with sugar.

4. Process of making extracts from vegetable substances consisting in taking vegetable substances used both for their volatile constituents and for their constituents soluble in water, infusing same, separating the liquid, evaporating said liquid *in vacuo* until an extract presenting the consistency of a soft paste is obtained, treating the paste with a 15 per cent. alcoholic solution filtering, again evaporating said paste *in vacuo*, mixing this substance with sugar and essential oil, dividing the products into pellets, drying said pellets at a low temperature, and then coating them with a layer of sugar.

5. Process of making extracts from vegetable substances consisting in taking vegetable substances used both for their volatile constituents and for their constituents soluble in water, extracting the fixed substances with water, evaporating to the consistency of a soft paste, treating the paste with a 15 per cent. alcoholic solution filtering, mixing said paste with sugar, incorporating therewith the essential oil obtained by distilling by steam another portion of vegetable substances of the same kind as that from which the fixed substances are extracted, dividing the product so obtained into pellets, drying said pellets at a low temperature, and then coating them with sugar.

6. Process of making extracts from vegetable substances consisting in taking vegetable substances used both for their volatile constituents and for their constituents soluble in water, infusing same, separating the liquid, evaporating said liquid *in vacuo* until an extract presenting the consistency of a soft paste is obtained, treating the paste with a 15 per cent. alcoholic solution filtering, again evaporating said paste *in vacuo*, mixing this substance with sugar and the essential oil obtained by distilling by steam another portion of vegetable substances of the same kind as that from which the fixed substances are extracted, dividing the product into pellets, drying said pellets at a low temperature and coating them with a layer of sugar.

In testimony whereof I affix my signature in presence of two witnesses.

HENRI SCHMIDT.

Witnesses:
CLAUDIUS LUSSON,
H. C. COXE.

Copies of this patent may be obtained for five cents each, by addressing the "Commissioner of Patents, Washington, D. C."